UNITED STATES PATENT OFFICE.

CARL LUDWIG MÜLLER, OF LUDWIGSHAFEN-ON-THE-RHINE, ASSIGNOR TO THE BADISCHE ANILIN AND SODA FABRIK, OF MANNHEIM, GERMANY.

PROCESS OF PREPARING DISAZO DYES.

SPECIFICATION forming part of Letters Patent No. 430,533, dated June 17, 1890.

Application filed April 3, 1890. Serial No. 346,440. (No specimens.) Patented in Germany August 31, 1888, No. 46,737, and August 20, 1889, No. 50,852, and in England October 23, 1888, No. 15,258, and September 9, 1889, No. 14,222.

*To all whom it may concern:*

Be it known that I, CARL LUDWIG MÜLLER, a subject of the King of Bavaria, residing at Ludwigshafen-on-the-Rhine, in the Kingdom of Bavaria and Empire of Germany, have invented new and useful Improvements in a New Process for the Preparation of Disazo Compounds, (for which Letters Patent were obtained in Germany, No. 46,737, dated August 31, 1888, and No. 50,852, dated August 20, 1889; in Great Britain, No. 15,258, dated October 23, 1888, and No. 14,222, September 9, 1889,) of which the following is a specification.

This invention relates to a process for the preparation of certain disazo compounds which dye unmordanted cotton from the boiling alkaline bath. These disazo compounds can be represented by the general formula:

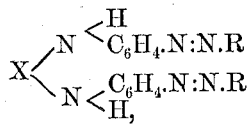

where X stands for a suitable intermediary, as hereinafter defined, and R for the residue of any such phenols, phenol-sulphonic acids, or phenol-carboxylic acids, or of any such amido-sulpho acids of the aromatic series as are capable of combining with diazo compounds to form azo bodies. Now the novelty of this process consists in making the disazo compounds not in the usual well-known way by combining phenolic or amido bodies with a tetrazo compound obtained from a diamido compound, but by combining together the molecules of azo bodies by twos by means of a suitable intermediary.

The amidoazo bodies which I use in carrying out this invention have the constitution represented by the following general formula: $H_2N^1.C_6H_4.N^4:N.R$, where R has the same meaning as hereinbefore attached to it—that is to say, the said amidoazo bodies are paramido-benzene-azo bodies, or, in other words, derivatives of para-phenylene diamine, one amido group of which has been replaced by the diazo group, and this diazo group has been used to combine, as the second element of the azo body, a compound belonging to the above-mentioned classes represented by R—viz: any such phenols, phenol-carboxylic acids, phenol-sulphonic acids, or amido-sulphonic acids of the aromatic series as are capable of combining with diazo compounds to form azo bodies.

Now although the preparation of paramido-benzene-azo bodies of the above-mentioned nature forms no part of my invented process, which process consists, as above said, in making disazo bodies by coupling the molecules of such paramido-benzene-azo bodies together by twos by means of a suitable intermediary, still, for the sake of convenience, I give an example of the process I prefer to use in the preparation of the said amidoazo bodies. I prefer in all cases to start from paramido acetanilide, or, as it is also called, "acetyl para-phenylene diamine" (*Nietzki, Berichte der Deutschen Chemischen Gesellschaft,* XVII, 343,) to diazotize this body by the action of nitrous acid and to combine the diazo-compounds thus obtained with the phenol, phenolsulphonic acid, phenolcarboxylic acid, or amidosulphonic acid of the aromatic series that I wish to use. I next eliminate the acetyl group from the azo compound thus obtained by the action of strong sulphuric acid or of caustic alkalies, and in this way obtain the paramido-benzene-azo bodies desired. As a concrete illustration of the mode of carrying out this preliminary process to obtain the raw material for carrying out my invention, I give the following example of the preparation of paramido-benzene-azo-salicylic acid. In this example and throughout this specification "by parts" are meant parts by weight.

About fifteen (15) parts of finely-powdered acetyl para-phenylene diamine (paramido acetanilide) are dissolved in a mixture of about forty-five (45) parts of hydrochloric acid, (containing about thirty-two per cent. of true acid HCl,) and about two hundred (200) parts of water and about two hundred (200) parts of ice are added Then about seven (7) parts of nitrate of soda, dissolved in about twenty-one (21) parts of water, are added and stirred or agitated for about an hour. The solution of the diazo-acetanilide thus obtained in the well-known manner is allowed to run slowly into a solution of about fifteen (15) parts of salicylic acid and about forty-five (45) parts of calcined soda in about three hundred (300) parts of water, and about one hundred and fifty (150) parts of ice are added to prevent undue rise of temperature. After standing for about twenty-four hours the crystalline azo compound, which has separated out, is collected upon a filter and well pressed. To eliminate the acetyl group the product obtained is, without drying, introduced into about two hundred (200) parts of ordinary concentrated or rectified sulphuric acid, and the mixture is heated on the boiling-water bath for about four hours. The product, when cold, is run slowly into cold water and the amidoazo compound, which separates out as a fine brown crystalline powder, is collected on a filter.

In the above example I have described the use of sulphuric acid for splitting off the acetyl group, inasmuch as it is cheapest, quickest, and, in this case, gives very good results; but apart from the question of economy the use of caustic soda is in many cases to be recommended.

As an example of a typical case where caustic soda can be advantageously used, I give the following directions for splitting off the acetyl group from the azo body resulting from the combination of acetyl-para-phenylene diamine with naphthionic acid. The azo body obtained from the combination of about fifteen (15) parts of acetyl-para-phenylene diamine after diazotization with about thirty-one (31) parts of crystallized sodium naphthionate, is boiled for about seven hours with a solution of caustic soda, made by mixing about sixty (60) parts of caustic-soda solution containing about thirty-five to thirty-six per cent. of sodium hydroxide with one hundred and fifty (150) parts of water, and water is added from time to time to replace that lost by evaporation. On cooling a coloring-matter the sodium salt of paramido-benzene-azo-naphthionic acid crystallizes out and is filtered and pressed.

Suitable intermediaries for coupling together the molecules of the paramido-benzene-azo bodies to form the disazo bodies, in accordance with this invention, are phosgene, which may be used either as gas or liquid, and thiophosgene, and for this latter may be substituted carbon bisulphide, and alcohol, in the presence of caustic alkalies, and in many cases ethylene-bromide, aldehydes, and ethers of oxalic acid can also be used.

The following examples will serve to illustrate the best manner of carrying out my process, performing the coupling by means of phosgene, which yields the best results.

About twenty-five (25) parts of a paramido-benzene-azo compound, as hereinbefore defined, are suspended in about one thousand (1,000) parts of water and about five hundred (500) parts of ice are added. If the paramido-benzene-azo compound be in the form of free acid, sufficient caustic soda must be added to cause a faint alkaline reaction in order to convert it into its sodium salt. Then phosgene-gas is led in or liquid phosgene added till the liquid has an acid reaction. During the operation ice, if necessary, must be added from time to time, so that there is always some in the liquid and undue rise of temperature is prevented. The new coloring-matter resulting from the coupling of the molecules of paramido-benzene-azo body separates practically completely out in the difficultly-soluble form of a free acid, which is filtered, pressed, and then converted into the mercantile form of soluble sodium salt by mixing it with the requisite quantity of powdered calcined soda and drying the product.

Coupling by means of thiophosgene may be effected by suspending the sodium salt of the amidoazo body in water in the same way and stirring with it the necessary quantity of thiophosgene; or the coupling may be effected by heating together one part of the amidoazo body, one part caustic potash with two parts carbon bisulphide and five parts water in a vessel furnished with an inverted condenser, and in a similar way ethyline dibromide and other intermediaries can be used.

The disazo bodies obtained by this process are substantive dye-stuffs—that is, they dye unmordanted cotton from the alkaline or soap bath. Their color depends upon the nature of the second element (hereinbefore denoted by R) of the amidoazo body.

Now although, as hereinbefore mentioned, other intermediaries than phosgene and thiophosgene can be used in coupling the amidoazo compounds together, still the most useful of these agents, and what I claim as new, is—

The hereinbefore-described process for the manufacture of disazo compounds, which process consists in coupling together the molecules of certain amidoazo compounds by twos by means of intermediaries, such as are phosgene and thiophosgene or carbon bisulphide, in the presence of alkalies and alcohol, and the said amidoazo bodies are paramido-benzene-azo bodies of the constitution represented by the formula $NH_2.C_6H_4:N:N.R$, in which the second element (the residue of which is in the above formula denoted by R) is a phenol, phenol-carboxylic acid, or phenol-sulphonic acid, or an amido-sulphonic acid of the aromatic series, capable of combining with diazo compounds and forming azo bodies.

In testimony whereof I have hereunto set my hand in the presence of two subscribing witnesses.

CARL LUDWIG MÜLLER.

Witnesses:
HEINRICH FINMANN,
ERNEST F. EHRHARDT.